(12) United States Patent
Ruhlow et al.

(10) Patent No.: US 7,685,104 B2
(45) Date of Patent: Mar. 23, 2010

(54) DYNAMIC BITMAP PROCESSING, IDENTIFICATION AND REUSABILITY

(75) Inventors: Randy W. Ruhlow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 10/753,515

(22) Filed: Jan. 8, 2004

(65) Prior Publication Data

US 2005/0154710 A1    Jul. 14, 2005

(51) Int. Cl.
*G06F 7/00* (2006.01)
(52) U.S. Cl. .................... 707/3; 707/4; 707/5; 707/101
(58) Field of Classification Search ...................... 707/3, 707/104.1, 10, 100, 2, 5, 4
See application file for complete search history.

(56) References Cited

U.S. PATENT DOCUMENTS

| | | | | |
|---|---|---|---|---|
| 5,495,608 | A * | 2/1996 | Antoshenkov | 707/3 |
| 5,560,007 | A * | 9/1996 | Thai | 707/3 |
| 5,706,495 | A * | 1/1998 | Chadha et al. | 707/2 |
| 5,758,145 | A * | 5/1998 | Bhargava et al. | 707/2 |
| 5,884,307 | A * | 3/1999 | Depledge et al. | 707/7 |
| 6,195,656 | B1 * | 2/2001 | Ozbutun et al. | 707/4 |
| 6,353,448 | B1 * | 3/2002 | Scarborough et al. | 715/744 |
| 6,442,539 | B1 * | 8/2002 | Amundsen et al. | 707/2 |
| 6,470,490 | B1 * | 10/2002 | Hansen | 717/106 |
| 6,658,405 | B1 * | 12/2003 | Ozbutun | 707/3 |
| 6,711,563 | B1 * | 3/2004 | Koskas | 707/3 |
| 6,757,671 | B1 * | 6/2004 | Galindo-Legaria et al. | 707/3 |
| 6,826,563 | B1 * | 11/2004 | Chong et al. | 707/4 |
| 6,879,976 | B1 * | 4/2005 | Brookler et al. | 707/3 |
| 7,016,910 | B2 * | 3/2006 | Egilsson et al. | 707/101 |
| 2002/0095397 | A1 * | 7/2002 | Koskas | 707/1 |
| 2004/0075706 | A1 * | 4/2004 | Kroon et al. | 347/15 |
| 2004/0181514 | A1 * | 9/2004 | Santosuosso | 707/3 |
| 2004/0181533 | A1 * | 9/2004 | Santosuosso | 707/10 |

OTHER PUBLICATIONS http://www-1.ibm.com/servers/enable/site/bi/evi.html — IBM Technical Resources,.
Bi — Accelerating Your Queries with Encoded Vector Indexes.

* cited by examiner

*Primary Examiner*—Hosain T Alam
*Assistant Examiner*—Leon Harper
(74) *Attorney, Agent, or Firm*—Patterson & Sheridan, LLP (57) ABSTRACT

A method, system and article of manufacture for query execution management in a data processing system and, more particularly, for managing execution of queries having one or more related query conditions. One embodiment provides a method for managing execution of a query against data of a database. The method comprises receiving a current query against the data of the database, the current query including a plurality of query conditions, for each query condition of the plurality of query conditions, determining whether a previously generated dynamic bitmap index can be re-used for the query condition of the current query, the dynamic bitmap index having been previously generated for a previous query condition associated with a previous query executed against the data of the database; and if the dynamic bitmap index has been generated for the previous query condition, retrieving the dynamic bitmap index, and determining a query result for the current query using all retrieved dynamic bitmap indexes.

21 Claims, 4 Drawing Sheets

DYNAMIC BITMAP PROCESSING, IDENTIFICATION AND REUSABILITY

BACKGROUND OF THE INVENTION

1. Field of the Invention

The present invention generally relates to query execution management and, more particularly, to managing execution of queries against one or more databases in a data processing system.

2. Description of the Related Art

Databases are computerized information storage and retrieval systems which can be organized in multiple different ways. An overall database organization is typically referred to as a schema for the database, such as a hierarchical or relational schema. A database schema is often compactly expressed using table names and names of columns in tables. Database schemas frequently take the form of a "star", where there is one large "mother" table and many small "detail" tables. For instance, a simple database schema including a large mother table "Name/Address" and a small detail table "City" could be expressed as:

Name/Address (LastName, FirstName, M.I., Postal Code, . . . ) City (CityName, PostalCode)

By way of example, the Name/Address table stores names, addresses and additional information for individuals in a multiplicity of columns "LastName", "FirstName" etc. Each row of the Name/Address table is associated with a specific individual. The City table stores city names and postal codes in two columns "CityName" and "PostalCode", respectively. Each row of the City table links a particular city name to a specific postal code. The PostalCode columns in the City and Name/Address tables are configured to join both tables.

Regardless of the particular database schema, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) in the case of a relational database. Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data in a database, and so forth.

Queries typically involve data selections based on attributes of detail tables followed by retrieval of information for searched data records, i.e., rows from a corresponding mother table. By way of example, using the City and Name/Address tables, a query can be issued to determine all individuals living in a particular city. To this end, all rows in the City table would be scanned to find those rows having the corresponding city name in the CityName column, and then the postal codes in those rows would be retrieved from the PostalCode column. Subsequently, the Name/Address table would be scanned to locate all rows having one of the retrieved postal codes in the PostalCode column. The located rows contain the searched information related to the individuals residing in the particular city.

Queries and, consequently, query workload can consume significant system resources, particularly processor resources. The system resources consumption of a query against one or more databases depends on the complexity of the query and the searched database(s). A typical way of reducing system resource consumption for looking up information in tables of a database consists in using indexes. One type of index is a bitmap index, which indicates whether a specific value exists for each row in a particular column. One bit represents each row. Accordingly, there may be an index into the Name/Address table identifying all rows in the PostalCode column that have a particular postal code value. For instance, in the bitmap index for the PostalCode column, the nth bit equals 1 if the nth row of the Name/Address table contains a value of "45246", or 0 if that row holds a value other than "45246". Typically there are multiple bitmap indexes for each column, one for each of several values that may appear in the column (e.g., one index for the value "45246", another index for the value "45202", and so on). Another type of index is an encoded vector index (EVI), disclosed, for example, in U.S. Pat. No. 5,706,495, issued Jan. 6, 1998 to Chadha et al., entitled ENCODED-VECTOR INDICES FOR DECISION SUPPORT AND WAREHOUSING, which is incorporated herein by reference. An EVI serves a similar purpose as a bitmap index, but only one index is necessary to account for all values occurring in the column (whether they are "45246", "45202", or any other). Accordingly, in an EVI on the PostalCode column, the nth position of the EVI contains a bit code that can be decoded using a lookup table to produce the value "45246", which is the postal code in the nth row of the table. Thus, whereas a separate bitmap index is required to map each particular key value in a database field, only one EVI is required to represent the same information. Therefore, an EVI saves computer memory by including all possible key values for a given field in one database index.

One difficulty when dealing with indexes is that both a bitmap index and an EVI index only information relating to a single column of the table. Thus, these indexes do not reflect relations between values in multiple columns. Such relations can be addressed by combining different indexes associated with different columns. For instance, assume a query which is to be executed on a table "ILLNESSES" having a multiplicity of columns including an "illness", "patient_age" and "patient_city" column. Using this query, a researcher may try to retrieve all rows from the ILLNESSES table that contain information relating to individuals having the illness "diabetes" and which are younger than "35" years or living in "Rochester". Assume further that the ILLNESSES table has 200 million rows and that each of the columns "illness", "patient-age" and "patient_city" has less than 25 distinct key values. Accordingly, for each column an EVI having an index size of approximately 200 MB can be provided. While processing of the query using the EVIs significantly decreases system resources consumption compared to a full scanning of the 200 million rows of the ILLNESSES table, processing speed and time remain a critical processing factor because of the large size of the EVIs.

Current database technology allows for deriving dynamic bitmap indexes from EVIs for improving processing speed and time when processing a query. Using dynamic bitmap indexing for rapid data retrieval, bitmaps can be built on the fly from existing EVIs to identify exactly which rows in a table a user searches. Thus, a dynamic bitmap index is a temporary data structure that is built from a permanent index, such as an EVI. The dynamic bitmap index contains one bit for each row in the table for a specified selection criterion. If the index entry matches the selection criterion, the bit is set. The system can thus scan the dynamic bitmap index and retrieve directly only those records from the table where the bit is set. In the above example, a dynamic bitmap index is created for each column of the ILLNESSES table. For instance, a dynamic bitmap index is generated according to the above described query using an EVI associated with the "patient_age" column and includes a bit set to "1" for each row of the ILLNESSES table that relates to an individual who is younger than 35 years. The generated dynamic bitmap indexes for all columns can be combined according to Boolean AND and/or OR operators to identify the requested rows in the ILLNESSES table. The Boolean operators correspond to the Boolean AND and/or OR operators which logically combine the columns "illness", "patient_age" and "patient_city" in the above described query (e.g., patient_age<35 OR patient_city=Rochester). As a result, a single final dynamic bitmap index can be obtained which identifies all relevant rows in the ILLNESSES table, thereby avoiding a complete scan of all rows in the table.

One shortcoming of the prior art is the manner in which execution of essentially similar queries is managed. For example, in a data mining environment queries are frequently executed that differ from each other only with respect to one or more of their respective query conditions. For instance, the above query may differ from another query only in that individuals younger than 35 years are searched instead of 55 year old individuals. When the other query is executed, the above described processing needs to be performed for the other query to determine another final dynamic bitmap index. As the EVIs associated with the columns of the ILLNESSES table are rather large, significant processing resources and time would, thus, also be required for processing the other query.

Therefore, there is a need for an effective query execution management in a data processing system for efficiently managing execution of similar queries.

SUMMARY OF THE INVENTION

The present invention is generally directed to a method, system and article of manufacture for query execution management in a data processing system and, more particularly, for managing execution of queries having one or more related query conditions.

One embodiment provides a method for managing execution of a query against data of a database. The method comprises receiving a current query against the data of the database, the current query including a plurality of query conditions, for each query condition of the plurality of query conditions, determining whether a previously generated dynamic bitmap index can be re-used for the query condition of the current query, the dynamic bitmap index having been previously generated for a previous query condition associated with a previous query executed against the data of the database; and if the dynamic bitmap index has been generated for the previous query condition, retrieving the dynamic bitmap index, and determining a query result for the current query using all retrieved dynamic bitmap indexes.

Another embodiment provides a method of providing query execution management support in a data processing system. The method comprises generating a dynamic bitmap index for a query condition, the query condition being associated with a query executed against a database of the data processing system, and storing the dynamic bitmap index persistently to allow retrieval of the stored dynamic bitmap index in execution of a subsequent query having a subsequent query condition related to the query condition against the database.

Another embodiment provides a computer readable medium containing a program which, when executed, performs a process for managing execution of a query against data of a database. The process comprises receiving a current query against the data of the database, the current query including a plurality of query conditions, for each query condition of the plurality of query conditions, determining whether a previously generated dynamic bitmap index can be re-used for the query condition of the current query, the dynamic bitmap index having been previously generated for a previous query condition associated with a previous query executed against the data of the database; and if the dynamic bitmap index has been generated for the previous query condition, retrieving the dynamic bitmap index, and determining a query result for the current query using all retrieved dynamic bitmap indexes.

Another embodiment provides a computer readable medium containing a program which, when executed, performs a process for providing query execution management support in a data processing system. The process comprises generating a dynamic bitmap index for a query condition, the query condition being associated with a query executed against a database of the data processing system, and storing the dynamic bitmap index persistently to allow retrieval of the stored dynamic bitmap index in execution of a subsequent query having a subsequent query condition related to the query condition against the database.

Still another embodiment provides a data processing system comprising a database having data and a query execution manager residing in memory for managing execution of a query against the data of the database. The query execution manager is configured for receiving a current query against the data of the database, the current query including a plurality of query conditions, for each query condition of the plurality of query conditions, determining whether a previously generated dynamic bitmap index can be re-used for the query condition of the current query, the dynamic bitmap index having been previously generated for a previous query condition associated with a previous query executed against the data of the database; and if the dynamic bitmap index has been generated for the previous query condition, retrieving the dynamic bitmap index, and determining a query result for the current query using all retrieved dynamic bitmap indexes.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

The present invention is generally directed to a method, system and article of manufacture for query execution management in a data processing system and, more particularly, for managing execution of queries having one or more related query conditions. In the data processing system queries are issued by an issuing entity, such as an application or a user, against one or more databases. Each query includes one or more query conditions. Upon receipt of a query from the issuing entity, one or more dynamic bitmap indexes are generated and used in execution of the query. One or more of the generated bitmap indexes may be stored for use with a subsequently received query(s). Upon receipt of a subsequent query from the issuing entity, a determination is made as to whether or not any of the stored dynamic bitmap indexes should be used for the current query. In one embodiment, this determination is made for each query condition of the current query. For example, a determination is made as to whether a previously generated dynamic bitmap index can be re-used for one of the query conditions of the query. If one or more of such dynamic bitmap indexes were generated previously, these dynamic bitmap indexes are retrieved from storage. For each query condition of the query, for which no associated dynamic bitmap index has been generated previously, a dynamic bitmap index may be generated. The dynamic bitmap index can be generated on the basis of, for example, an encoded vector index or a radix tree index associated with the query condition. Each generated dynamic bitmap index can be stored persistently in storage if one or more predefined conditions are fulfilled.

The query conditions of the query are logically combined using operators, such as Boolean operators. In one embodiment, using the operators, all retrieved and generated dynamic bitmap indexes can be logically combined to determine a single final dynamic bitmap index. Logically combining the retrieved/generated dynamic bitmap indexes is performed on the basis of the logical combination of the corresponding query conditions as specified by the query. The single final dynamic bitmap index indicates all rows in a table of the database which are accessed during execution of the query. Thus, the query result is determined on the basis of the single final dynamic bitmap index and returned to the issuing entity.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatuses, single-user workstations, or network appliances that do not have non-volatile storage of their own.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Figure 1:
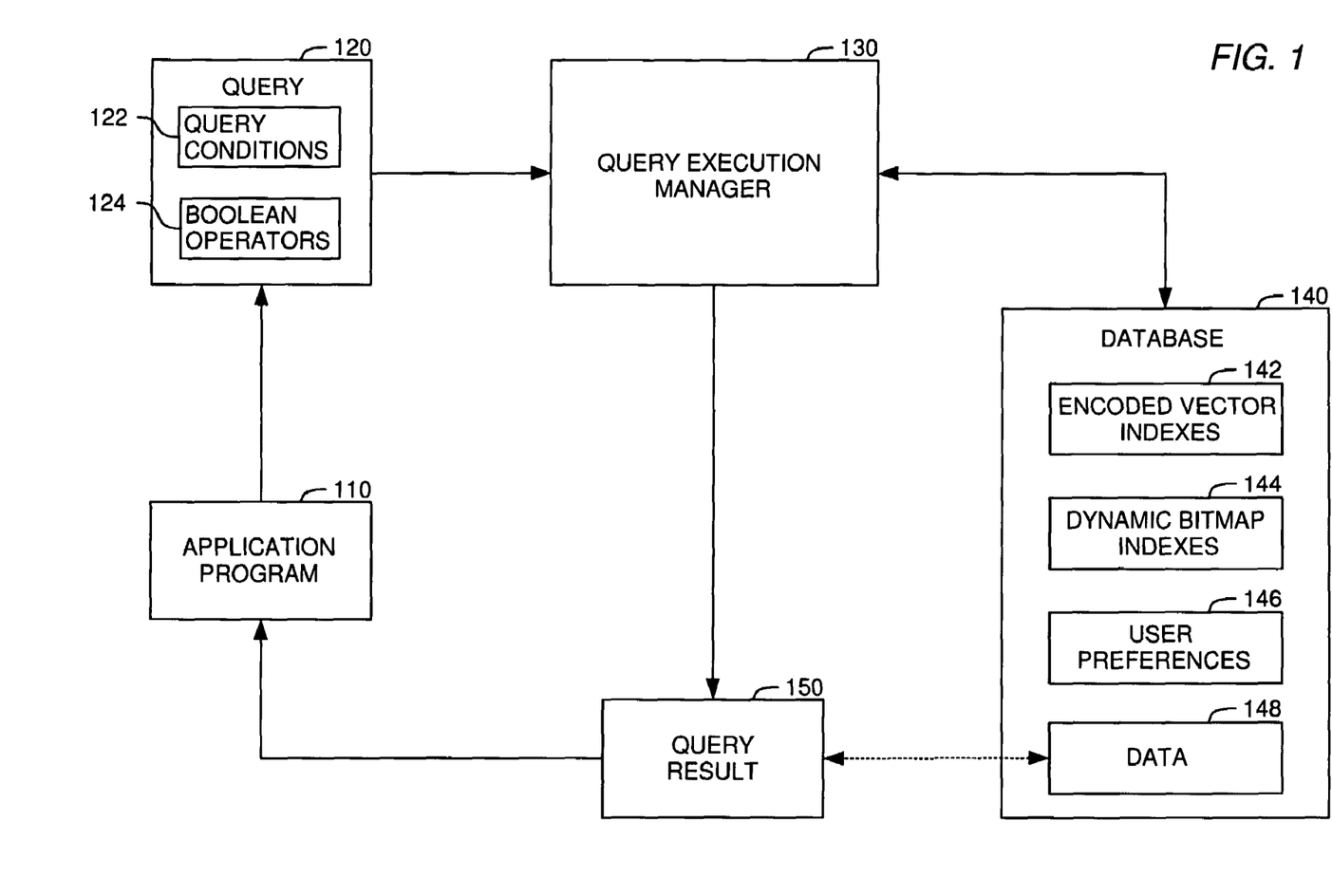
FIG. 1 is a relational view of components implementing the invention.

Referring now to FIG. 1, an illustrative relational view of components of the invention is shown. The components operate and interact for managing execution of queries, some of which are similar queries. As used herein, a first and a second query are "similar" if a subset of all query conditions of the first query is related to a subset of all query conditions of the second query. The components include an application program 110, a query execution manager 130 and one or more databases 140. Interaction and operation of the application program 110, the query execution manager 130 and the database(s) 140 are described in more detail below with reference to FIGS. 2-4.

In one embodiment, the query execution manager 130 receives a query 120 from the application program 110 for execution against the database(s) 140. More generally, the query execution manager 130 can receive the query 120 from any issuing entity, including a user and/or an operating system. The query 120 includes a plurality of query conditions 122 specifying selection criteria for data 148 of the database(s) 140. The query conditions 122 are logically combined by Boolean operators 124, such as Boolean AND and/or OR operators.

Upon receipt of the query 120, the query execution manager 130 determines all query conditions 122 and respective Boolean operators 124. For each of the query conditions 122, the query execution manager 130 determines whether a dynamic bitmap index on the data 148 of the database(s) 140 has been generated and stored previously for a previous query condition related to the query condition 122. In one aspect, query conditions are related if they are identical to one another. However, in some cases even non-identical query conditions are sufficiently related for purposes of the present invention. More generally, query conditions are related if the dynamic bitmap index, or its complement, of one query condition may be used to represent the other query condition, whereby all or at least some of the relevant records are searched. Consider, for example, an initial query condition searching for a character string "MISSION" and a subsequent query condition searching for a character string "MISS". Each record satisfying the initial query condition necessarily satisfies the subsequent query condition so that the dynamic bitmap index of the initial query condition can be re-used for the subsequent query condition. Therefore, the initial query condition and the subsequent query condition are said to be related, for purposes of the present application. As noted, a query condition may also be related to another query condition if its complement returns the same, or some of the same, records as the other query condition. For example, consider the query conditions xyz>=7 and xyz<7. In this case, the query conditions are complements and, therefore, the complement of the dynamic bitmap index for the query condition xyz>=7 can be used for the query condition xyz<7.

To determine the existence of a previously generated dynamic bitmap index that can be re-used for the present query condition, the query execution manager 130 accesses a dynamic bitmap indexes component 144 which relates a plurality of persistently stored dynamic bitmap indexes and associated query conditions. If a corresponding dynamic bitmap index has been generated and stored previously, the corresponding dynamic bitmap index is retrieved using the dynamic bitmap indexes component 144. If no associated dynamic bitmap index has been previously generated for the condition, it is contemplated that a dynamic bitmap index is now generated. This also applies if the associated dynamic bitmap index has been generated, but cannot be retrieved from the dynamic bitmap indexes component 144. For instance, the associated dynamic bitmap index has been deleted from the dynamic bitmap indexes component 144 to reduce required storage capacity or has not been stored upon generation according to user preferences as explained in more detail below with reference to FIG. 3. In one embodiment, the dynamic bitmap index is generated on the basis of an encoded vector index related to the query condition. Illustratively, the encoded vector index is provided by an encoded vector indexes component 142 including a plurality of encoded vector indexes. However, generating a dynamic bitmap index using an encoded vector index is merely one possible implementation. Other embodiments using other indexes, such as a radix tree index, are also contemplated. Furthermore, it should be noted that generation of dynamic bitmap indexes is well known in the art and will, therefore, not be explained in more detail. Moreover, it should be noted that generating a dynamic bitmap index is described by way of example, but does not limit the invention to this aspect. In other words, instead of generating dynamic bitmap indexes if they cannot be retrieved, corresponding encoded vector indexes or other available bitmap indexes can directly be used together with retrieved dynamic bitmap indexes to determine a query result. Thus, generation of new dynamic bitmap indexes can be avoided.

Upon generation or retrieval of a dynamic bitmap index for each of the query conditions 122, the query execution manager 130 logically combines the generated and retrieved dynamic bitmap indexes using the Boolean operators 124. Accordingly, the query execution manager 130 determines a single final dynamic bitmap index. The single final dynamic bitmap index indicates all rows in a table of the database(s) 140 which constitute query result 150. More specifically, the single final dynamic bitmap index has a total number of rows that corresponds to the total number of rows of the table of the database(s) 140. Furthermore, the rows of the single final dynamic bitmap index and the rows of the table are ordered in the same sequence. For each row of the table that should be included in the query result 150, the single final dynamic bitmap index includes a bit set to "1". For all other rows that should not be included in the query result 150 the single final dynamic bitmap index includes a bit set to "0". Thus, the query result 150 is built on the basis of the single final dynamic bitmap index by including all rows of the table having a bit set to "1" in a corresponding row of the single final dynamic bitmap index into the query result 150. The query result 150 is then returned to the application program 110, which issued the query 120.

Each generated dynamic bitmap index can be stored persistently in storage. Illustratively, generated dynamic bitmap indexes are stored in the dynamic bitmap indexes component 144. According to one aspect, the generated dynamic bitmap indexes are only stored if one or more predefined conditions are fulfilled. The predefined conditions are defined by user preferences 146, which can be provided by a user using a suitable user interface. In one embodiment, the user interface can be configured to enable the user to set one or more threshold values adapted for controlling storage of dynamic bitmap indexes.

Figure 3:
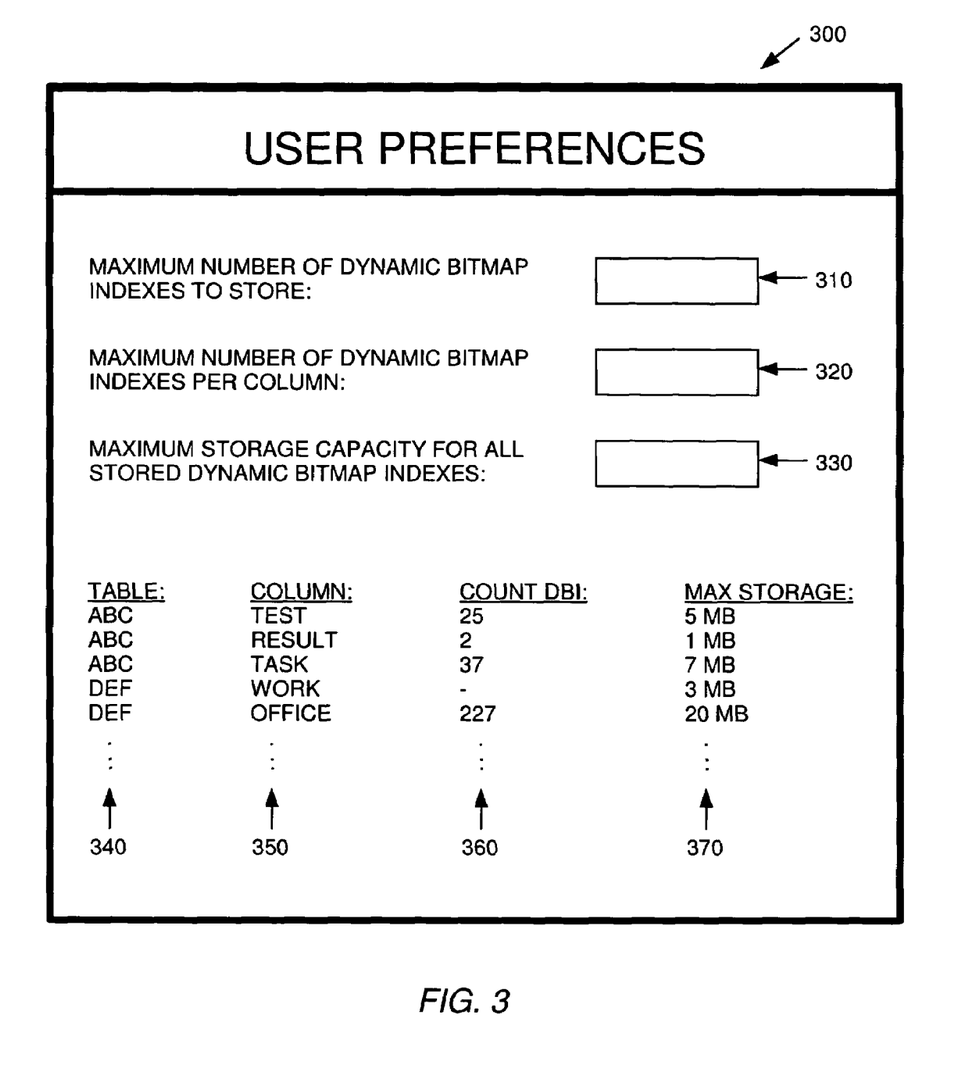
FIG. 3 is an illustrative user interface for providing user preferences in one embodiment.

Referring now to FIG. 3, an illustrative user interface 300 is shown. By way of example, the user interface 300 enables the user to provide a maximum number of all dynamic bitmap indexes which can be stored in the dynamic bitmap indexes component 144 using a text field 310. When a given dynamic bitmap index is generated, the total amount of stored dynamic bitmap indexes is calculated and compared with the maximum number. The given generated dynamic bitmap index is stored persistently only if the total amount does not exceed the maximum number. Furthermore, the user may provide a maximum number of all dynamic bitmap indexes which can be stored for a given column of a table of the database(s) 140 using a text field 320. In other words, for each column of the table, one or more dynamic bitmap indexes can be generated and stored. When the given dynamic bitmap index is generated, the total amount of stored dynamic bitmap indexes for the given column is calculated and compared with the maximum number for the given column. The given generated dynamic bitmap index is stored persistently only if the total amount of the given column does not exceed the maximum number for the given column. Furthermore, the user can provide a maximum allowed storage capacity for the dynamic bitmap indexes component 144 using a text field 330. In other words, the user can determine a maximum capacity of storage available for storing all generated dynamic bitmap indexes. When the given dynamic bitmap index is generated, the total amount of required storage capacity for the dynamic bitmap indexes component 144 is calculated and compared with the maximum allowed storage capacity. The given generated dynamic bitmap index is stored persistently only if the total amount of required storage capacity does not exceed the maximum allowed storage capacity.

Illustratively, the user interface 300 further includes statistics about tables, columns and associated dynamic bitmap indexes. More specifically, the user interface 300 includes a listing 340 of all tables included in the database(s) 140, a listing 350 of all columns included in the tables and a listing 360 having a number of stored dynamic bitmap indexes for each of the columns. These statistics provide information to the user which may be useful in providing appropriate threshold values. By way of example, the user may provide a maximum allowed storage capacity for all dynamic bitmap indexes associated with one of the columns in a listing 370. Furthermore, the user can adjust the maximum allowed storage capacity for a given column on the basis of these statistics, for instance, if the number of stored dynamic bitmap indexes for that column is large. For instance, the user may allocate a large amount of storage capacity to a column having a multitude of dynamic bitmap indexes.

The user preferences provided via the exemplary user interface described above relate to threshold values provided by the user. However, the invention is not limited to the above described threshold values. Other threshold values can be provided by the user, which are also suitable for controlling storage of dynamic bitmap indexes. For instance, a maximum number of allowed dynamic bitmap indexes per table and column may be provided in one embodiment. Moreover, the invention is not limited to the use of the above described threshold values. Instead, other user preferences which are suitable for determining whether a generated dynamic bitmap index should be stored are also contemplated, as will be explained in the following.

Referring back to FIG. 1, the user preferences 146 may indicate that dynamic bitmap indexes for query conditions of queries against a specific table of the database(s) 140 should always be stored persistently. Corresponding parameters in the user preferences 146 can be set in numerous ways, for instance, using the Change Query attributes (CHGQRYA) control language (CL) command available in IBM's DB2 Universal Database for iSeries. The CHGQRYA CL command is suitable for modifying different types of attributes of queries, such as the degree of parallelism or a maximum allowable execution time. The different attributes are defined in a query options file (QAQQINI). By way of example, an exemplary attribute provided in the QAQQINI file is a QUERY_TIME_LIMIT attribute that is provided for setting the maximum allowable query execution time. Accordingly, an attribute as, for instance, STORE_DYNAMIC_BITMAPS may be set in the QAQQINI file to indicate that all dynamic bitmap indexes generated for the query conditions 122 should be stored persistently.

According to another aspect, the query execution manager 130 autonomically determines the user preferences 146. Thus, the query execution manager 130 can determine autonomically which dynamic bitmap indexes should be stored persistently in or deleted from the dynamic bitmap indexes component 144. To this end, the query execution manager 130 tracks all requests for dynamic bitmap indexes. Furthermore, the query execution manager 130 tracks requests for indications of key values associated with the dynamic bitmap indexes. A particular dynamic bitmap index may, for instance, indicate all rows in a PostalCode column of a given database table that contain a particular postal code key value, e.g., "45246". On the basis of the tracked dynamic bitmap indexes and key values, the query execution manager 130 determines a user behavior pattern indicating a frequency of requests for the tracked dynamic bitmap indexes. Accordingly, the user behavior pattern represents the user preferences 146 according to this aspect. Using the user behavior pattern, the query execution manager 130 determines whether a given query condition associated with a specific key value is frequently included in queries issued from the user against data of the database(s) 140. In other words, if a specific dynamic bitmap index associated with the given query condition is frequently requested, this indicates that the given query condition is frequently included in queries and that the associated dynamic bitmap index should be stored. Conventional techniques, which are generally referred to as pattern recognition technology, may be used to perform this determination. In one embodiment, the query execution manager 130 may use the STRDBMON (STart DataBase MONitor) control language (CL) command available in IBM's DB2 Universal Database for iSeries. The STRDBMON CL command is suitable for collecting information on previously started jobs or new jobs started after the monitor collection has begun. Thus, the STRDBMON CL command can be used for tracking the dynamic bitmap indexes and associated key values. If the query execution manager 130 determines that the user often includes the given query condition associated with the specific key value in queries against the data, the query execution manager 130 stores the corresponding dynamic bitmap index persistently. For instance, the user may often request retrieval of all the rows in the PostalCode column that contain the particular postal code key value "45246". However, the user may rarely request retrieval of the rows in the PostalCode column that contain the particular postal code key value "45202". Thus, the query execution manager 130 would persistently store the dynamic bitmap index associated with the query condition which is suitable for retrieving all the rows in the PostalCode column that contain the particular postal code key value "45246". However, the query execution manager 130 would not store the dynamic bitmap index associated with the query condition which is suitable for retrieving the rows in the PostalCode column that contain the particular postal code key value "45202".

Figure 2A:
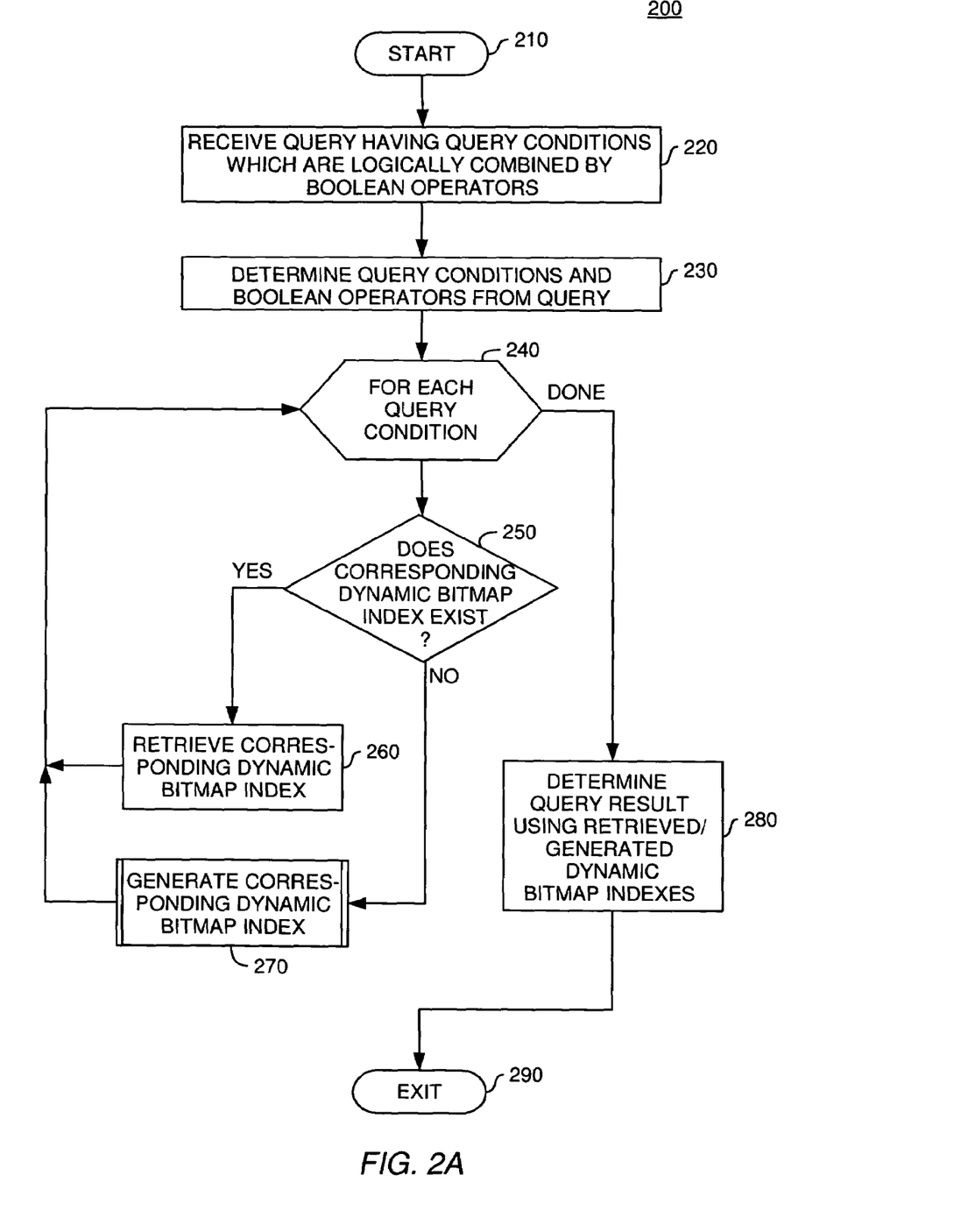
FIGS. 2A-2B are flow charts illustrating query execution management in one embodiment.

Exemplary query execution management processes performed by a query execution manager (e.g., query execution manager 130) in a data processing system are described below with reference to FIGS. 2A-2B. Referring now to FIG. 2A one embodiment of a method 200 for query execution management is illustrated. The method 200 starts with step 210.

At step 220, a query (e.g., query 120 of FIG. 1) against one or more databases (e.g., database(s) 140 of FIG. 1) is received from an issuing entity (e.g., application program 110 of FIG. 1). According to one aspect of the invention, the received query is an SQL query. One of the most common executed SQL queries is the SELECT statement. The SELECT statement generally has the format: "SELECT<clause>FROM<clause>WHERE<clause>GROUP BY<clause>HAVING<clause>ORDER BY <clause>". The clauses must generally follow this sequence. Only the SELECT and FROM clauses are required and all other clauses are optional. The result of a SELECT statement is, in general, a subset of data retrieved from one or more existing tables stored in a relational database, wherein the FROM clause identifies the name of the table or tables from which the data is being selected. The subset of data is treated as a new table, termed the result table. The WHERE clause determines which rows should be returned in the result table. Generally, the WHERE clause contains one or more query conditions (e.g., query conditions 122 of FIG. 1) that must be satisfied by each row returned in the result table. The rows that meet the query condition(s)

form an intermediate set, which is then processed further according to specifications in the SELECT clause. The query condition(s) are typically one or more predicates, each of which specifies a comparison between two values from certain columns, constants or correlated values. Multiple predicates in the WHERE clause are typically connected by Boolean operators, such as Boolean AND and/or OR operators (e.g., Boolean operators 124 of FIG. 1). An SQL query exemplifying the query 120 is shown below in Table I.

TABLE I

EXEMPLARY SQL QUERY

| 001: | SELECT* |
| 002: | FROM Illnesses |
| 003: | WHERE illness=diabetes AND (patient_age<35 OR patient_city=Rochester) |

The exemplary SQL query of Table I is executed on a table "Illnesses" (line 002) having a multiplicity of columns including an "illness", "patient_age" and "patient city" column. Using this query, a researcher may try to retrieve all rows (line 001) from the Illnesses table (line 002) that fulfill all query conditions defined by a WHERE clause (line 003). More specifically, the WHERE clause in line 003 includes three query conditions which are logically combined by a Boolean AND and a Boolean OR operator. The query conditions define that information relating to individuals (i) having the illness "diabetes" (illness=diabetes) and which are either (ii) younger than "35" years (patient_age<35) or (iii) living in "Rochester" (patient_city=Rochester) should be retrieved. The query conditions (ii) and (iii) are logically combined by the Boolean OR operator. The logically combined query conditions (ii) and (iii) are logically combined with the query condition (i) by the Boolean AND operator.

For purposes of illustration, the continuation of the description of FIG. 2A is explained with reference to the exemplary SQL query shown in Table I above. In other words, for the following explanations it is assumed that the exemplary SQL query of Table I has been received at step 220. Furthermore, it is assumed that the exemplary SQL query of Table I is executed against the exemplary database table "Illnesses" shown in Table II below.

TABLE II

EXEMPLARY DATABASE TABLE "ILLNESSES"

| 001 | patient_ID | patient_age | race | illness | patient_city |
|---|---|---|---|---|---|
| 002 | 1 | 45 | American | diabetes | Rochester |
| 003 | 2 | 17 | Russian | diabetes | LaCrosse |
| 004 | 3 | 33 | American | asthma | Rochester |
| 005 | 4 | 9 | American | diabetes | LaCrosse |
| 006 | 5 | 16 | Asian | hypertension | Rochester |
| 007 | 6 | 72 | American | diabetes | LaCrosse |
| 008 | 7 | 15 | Asian | asthma | Rochester |
| 009 | 8 | 29 | Caucasian | diabetes | LaCrosse |
| 010 | 9 | 80 | American | diabetes | Rochester |
| 011 | 10 | 75 | Hispanic | hypertension | LaCrosse |
| 012 | 11 | 53 | Hispanic | hypertension | Rochester |
| 013 | 12 | 67 | German | diabetes | LaCrosse |
| 014 | 13 | 31 | Asian | asthma | Rochester |
| 015 | 14 | 47 | American | hypertension | LaCrosse |
| 016 | 15 | 19 | American | diabetes | Rochester |
| 017 | 16 | 28 | Asian | diabetes | LaCrosse |

At step 230, all query conditions and Boolean operators are determined from the received query. Accordingly, the query conditions "illness=diabetes", "patient_age<35" and "patient city=Rochester" and the Boolean operators "AND" and "OR" are determined from line 003 of Table I.

At step 240, a loop consisting of steps 250 and 260 or 250 and 270 is entered. This loop is performed for each query condition of the determined query conditions. For instance, the loop may initially be executed for the query condition "illness=diabetes". It should be noted that execution of the loop consisting of steps 250 and 260 or 250 and 270 is described in the following with respect to execution for each query condition for purposes of illustration. However, the loop may alternatively be executed for each stored dynamic bitmap index. In this case, it may be determined for each stored dynamic bitmap index whether it relates to one of the query conditions. Thus, the described steps are merely illustrative for a process of managing reuse of stored dynamic bitmap indexes. However, other implementations are possible and, therefore, also contemplated.

At step 250, it is determined whether a corresponding dynamic bitmap index has been generated and stored previously for the query condition. If it is determined that the corresponding dynamic bitmap index has been generated and stored previously, the corresponding dynamic bitmap index is retrieved at step 260. In one embodiment, it is determined, prior to retrieving the corresponding dynamic bitmap index, whether relevant data (e.g., the data 148 of FIG. 1) of the database(s) has changed since storage of the corresponding dynamic bitmap index. If the relevant data has substantially changed, the corresponding dynamic bitmap index may not be accurate. However, in many cases where different queries are issued against the data of the database(s) within one session, often only minor changes on the relevant data occur. In these cases, especially if processing time is a critical factor, it may be preferred to be aware of and accept certain inaccuracies in the query result in order to accelerate query execution. Thus, determination on whether the relevant data has changed can frequently be avoided.

By way of example, assume that the dynamic bitmap index (01101010110010011) is retrieved for the query condition "illness=diabetes" at step 260 and that the relevant data has not changed. This dynamic bitmap index is shown in vector form for brevity. Each bit in this dynamic bitmap index corresponds to a row of the exemplary database Table "Illnesses" shown in Table II. More specifically, the first bit "0" in the dynamic bitmap index indicates that the "illness" column in row 1 of Table II does not contain "diabetes" and the last bit "1" indicates that row 017 of Table II contains "diabetes" in its "illness" column.

If the corresponding dynamic bitmap index has not been generated and stored previously, the corresponding dynamic bitmap index can be generated at step 270. Generation of the corresponding dynamic bitmap index is explained in more detail below with reference to FIG. 2B.

When the loop consisting of steps 250 and 260 or 250 and 270 has been executed for all query conditions of the query of Table I, processing continues at step 280. At step 280, all retrieved/generated dynamic bitmap indexes are used to retrieve all rows from the exemplary database table "Illnesses" shown in Table II which fulfill the exemplary SQL query of Table I. However, as mentioned above, instead of generating and using the generated dynamic bitmap indexes, only retrieved dynamic bitmap indexes may be used together with other existing bitmap indexes or encoded vector indexes to determine the query result.

In one embodiment, all retrieved/generated dynamic bitmap indexes are logically combined according to the Boolean operators determined at step 230. For instance, assume that the dynamic bitmap index (00111101100001011) is retrieved for the query condition "patient_age<35" and that the dynamic bitmap index (01010101010101010) is retrieved for the query condition "patient_city=Rochester". These dynamic bitmap indexes are shown in vector form for brevity. According to line 003 of Table I, these query conditions are logically combined by a Boolean OR operator. Accordingly, both dynamic bitmap indexes are logically combined using the Boolean OR operator. Thus, a combined dynamic bitmap index (01111101110101011) is generated. In one embodiment, the logically combined dynamic bitmap index can be stored (as opposed to, or in addition to, the two individual dynamic bitmap indexes) and thus retrieved, for instance, if the logical OR combination of the query conditions is frequently requested. This combined dynamic bitmap index is then logically combined with the dynamic bitmap index (01101010110010011) for the query condition "illness=diabetes" using a Boolean AND operator according to line 003 of Table I. Accordingly, a final dynamic bitmap index (01101000110000011) is generated which indicates that rows 2, 3, 5, 9, 10, 16 and 17 of the exemplary database table "Illnesses" shown in Table II above fulfill the query conditions of the exemplary SQL query of Table I. Thus, rows 2, 3, 5, 9, 10, 16 and 17 of the exemplary database table "Illnesses" are returned as query result (e.g., query result 150 of FIG. 1) and method 200 exits at step 290.

Figure 2B:
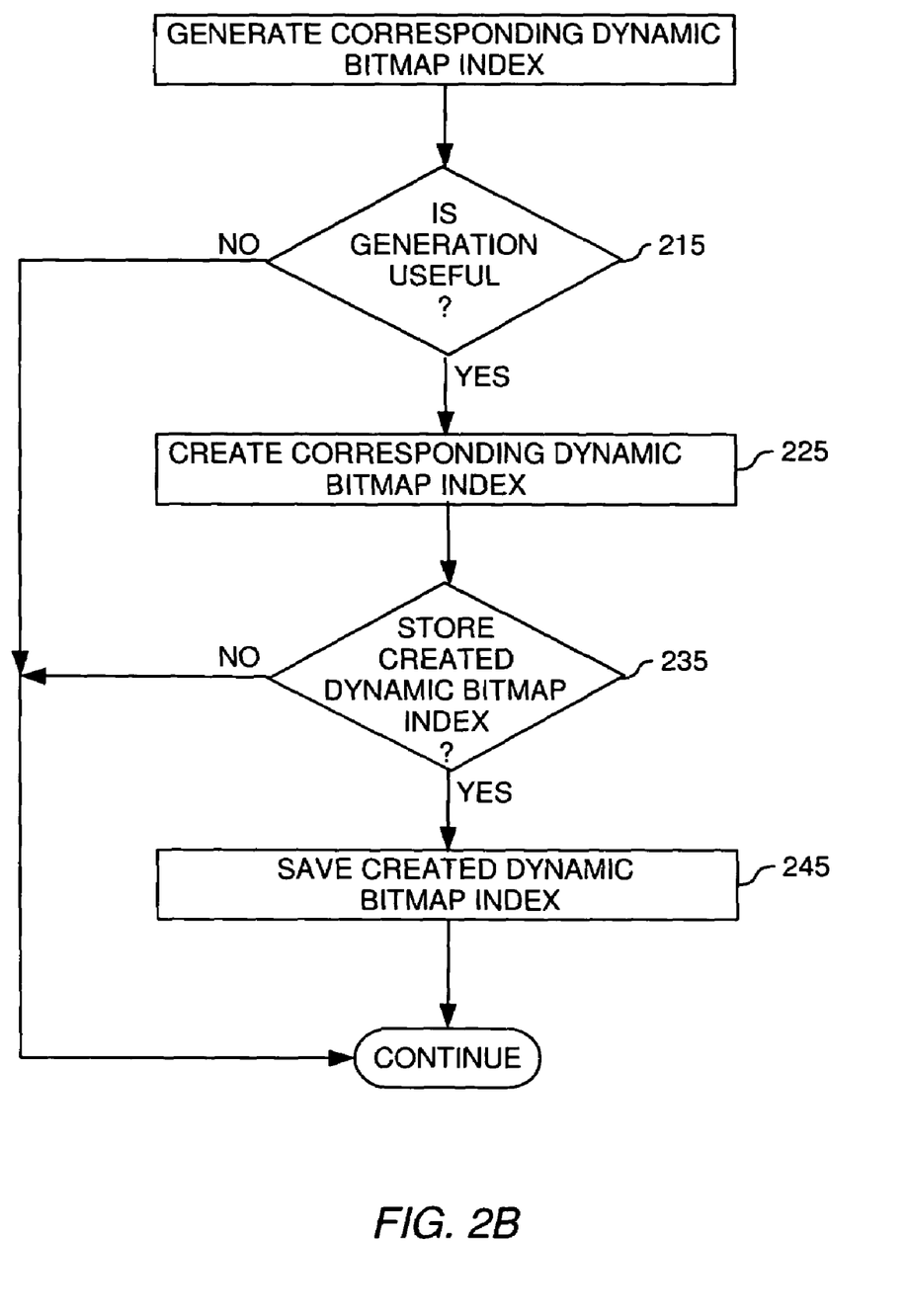

Referring now to FIG. 2B, generation of the corresponding dynamic bitmap index according to step 270 of FIG. 2A is explained in more detail. At step 215, it is determined whether generation of the corresponding dynamic bitmap index is required. In one embodiment, this determination may take into account parameters relating to a queried table, e.g., the exemplary database table "Illnesses" of Table II. For instance, if a total number of rows of the queried table does not exceed a predetermined threshold, it can be assumed that the corresponding dynamic bitmap index should not be generated in order to reduce processing resources and time that are required to execute the query. Furthermore, if a corresponding bitmap index or encoded vector index can be retrieved, these indexes may directly be used to accelerate query execution. Furthermore, if the corresponding dynamic bitmap index is to be generated for a query condition, i.e., a column of the queried table, which is only infrequently accessed, generation of the corresponding dynamic bitmap index can be avoided. Accordingly, if it is determined at step 215 that the corresponding dynamic bitmap index should not be generated, processing continues at step 240 of FIG. 2A. If, however, the corresponding dynamic bitmap index should be generated, the corresponding dynamic bitmap index is created at step 225.

At step 235, it is determined whether storage of the created dynamic bitmap index is required. To this end, user preferences (e.g., user preferences 146 of FIG. 1) are determined and the database manager determines whether the created dynamic bitmap index should be stored in accordance with the determined user preferences, as explained in detail above. If it is determined at step 235 that the created dynamic bitmap index should not be stored, processing continues at step 240 of FIG. 2A. If, however, it is determined at step 235 that the created dynamic bitmap index should be stored, the created dynamic bitmap index is saved at step 245. Processing then continues at step 240 of FIG. 2A.

In various embodiments, the invention provides numerous advantages over the prior art. For instance, in one embodiment dynamically created dynamic bitmap indexes are reused across different executions of the same query. In another embodiment, the dynamically created dynamic bitmap indexes are used across executions of different queries that are similar in nature. Furthermore, in one embodiment it is determined whether dynamically created dynamic bitmap indexes should be reused. This determination can be performed by a user or in an autonomic manner to control generation and storage/deletion of dynamic bitmap indexes.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A method for managing execution of a query against data of a database, comprising:
   receiving a current query against the data of the database, the current query including a plurality of query conditions;
   for the plurality of query conditions:
      determining whether any previously generated dynamic bitmap index can be re-used for the query, the previously generated dynamic bitmap index having been previously generated to satisfy a previous query executed against the data of the database, wherein a first and a second query condition of the plurality of query conditions are connected by an operator and wherein the dynamic bitmap index is a combination, according to the operator, of (i) a first dynamic bitmap index generated for a query condition related to the first query condition and (ii) a second dynamic bitmap index generated for a query condition related to the second query condition; and
      retrieving the previously generated dynamic bitmap index; and
   determining a query result for the current query using only the retrieved previously generated dynamic bitmap index; and
   if no previously generated dynamic bitmap index can be re-used, for the plurality of query conditions:
      generating a dynamic bitmap index for a combination of at least two query conditions of the plurality of query conditions connected by at least one operator; and
      storing the generated dynamic bitmap index for retrieval in execution of a subsequent query having a subsequent related query condition.

2. The method of claim 1, wherein the previously generated dynamic bitmap index has been generated using at least one of an encoded vector index and a radix tree index.

3. The method of claim 1, wherein the current query is an SQL query having a WHERE clause, and wherein each query condition of the plurality of query conditions is a predicate of the WHERE clause.

4. The method of claim 1, further comprising, prior to storing the generated dynamic bitmap index:
   determining, from predefined user preferences, whether storing the generated dynamic bitmap index is requested; and
   storing the generated dynamic bitmap index only if requested by the predefined user preferences.

5. The method of claim 1, further comprising, prior to storing the generated dynamic bitmap index:

determining whether a number of stored dynamic bitmap indexes exceeds a predetermined threshold; and storing the generated dynamic bitmap index only if the number of stored dynamic bitmap indexes does not exceed the predetermined threshold.

6. The method of claim 1, wherein the data of the database includes at least one data table having a plurality of columns, the generated dynamic bitmap index being associated with a specific column, the method further comprising, prior to storing the generated dynamic bitmap index:

determining whether a number of stored dynamic bitmap indexes for the specific column exceeds a predetermined threshold; and storing the generated dynamic bitmap index only if the number of stored dynamic bitmap indexes for the specific column does not exceed the predetermined threshold.

7. The method of claim 1, further comprising, prior to storing the generated dynamic bitmap index:

determining whether a required storage capacity for all stored dynamic bitmap indexes exceeds a predetermined threshold; and storing the generated dynamic bitmap index only if the required storage capacity does not exceed the predetermined threshold.

8. The method of claim 1, wherein the data of the database includes at least one data table having a plurality of columns, the generated dynamic bitmap index being associated with a specific column, the method further comprising, prior to storing the generated dynamic bitmap index:

determining whether a required storage capacity for all stored dynamic bitmap indexes for the specific column exceeds a predetermined threshold; and storing the generated dynamic bitmap index only if the a required storage capacity for all stored dynamic bitmap indexes for the specific column does not exceed the predetermined threshold.

9. The method of claim 1, further comprising, prior to storing the generated dynamic bitmap index:

retrieving a user behavior pattern indicating a multiplicity of query conditions of previous queries executed by a user, the multiplicity of query conditions including the previous query condition;

determining, from the user behavior pattern, a frequency of occurrence of the previous query condition; and storing the generated dynamic bitmap index only if the frequency of occurrence exceeds a predetermined threshold.

10. The method of claim 1, further comprising:

determining whether the data of the database has changed since execution of the previous query; and determining a query result for the current query using the retrieved previously generated dynamic bitmap indexes only if the data of the database has not changed.

11. A tangible computer readable storage medium containing a program which, when executed, performs a process for managing execution of a query against data of a database, the process comprising:

receiving a current query against the data of the database, the current query including a plurality of query conditions;

for the plurality of query conditions:

determining whether any previously generated dynamic bitmap index can be re-used for the current query, the previously generated dynamic bitmap index having been previously generated to satisfy a previous query executed against the data of the database, wherein a first and a second query condition of the plurality of query conditions are connected by an operator and wherein the dynamic bitmap index is a combination, according to the operator, of (i) a first dynamic bitmap index generated for a query condition related to the first query condition and (ii) a second dynamic bitmap index generated for a query condition related to the second query condition; and retrieving the previously generated dynamic bitmap index; and determining a query result for the current query using only the retrieved previously generated dynamic bitmap index; and if no previously generated dynamic bitmap index can be re-used, for the plurality of query conditions:

generating a dynamic bitmap index for a combination of at least two query conditions of the plurality of query conditions connected by at least one operator; and storing the generated dynamic bitmap index for retrieval in execution of a subsequent query having a subsequent related query condition.

12. The tangible computer readable storage medium of claim 11, wherein the previously generated dynamic bitmap index has been generated using at least one of an encoded vector index and a radix tree index.

13. The tangible computer readable storage medium of claim 11, wherein the current query is an SQL query having a WHERE clause, and wherein each query condition of the plurality of query conditions is a predicate of the WHERE clause.

14. The tangible computer readable storage medium of claim 11, wherein the process further comprises, prior to storing the generated dynamic bitmap index:

determining, from predefined user preferences, whether storing the generated dynamic bitmap index is requested; and storing the generated dynamic bitmap index only if requested by the predefined user preferences.

15. The tangible computer storage readable medium of claim 11, wherein the process further comprises, prior to storing the generated dynamic bitmap index:

determining whether a number of stored dynamic bitmap indexes exceeds a predetermined threshold; and storing the generated dynamic bitmap index only if the number of stored dynamic bitmap indexes does not exceed the predetermined threshold.

16. The tangible computer readable storage medium of claim 11, wherein the data of the database includes at least one data table having a plurality of columns, the generated dynamic bitmap index being associated with a specific column, the process further comprising, prior to storing the generated dynamic bitmap index:

determining whether a number of stored dynamic bitmap indexes for the specific column exceeds a predetermined threshold; and storing the generated dynamic bitmap index only if the number of stored dynamic bitmap indexes for the specific column does not exceed the predetermined threshold.

17. The tangible computer readable storage medium of claim 11, wherein the process further comprises, prior to storing the generated dynamic bitmap index:

determining whether a required storage capacity for all stored dynamic bitmap indexes exceeds a predetermined threshold; and storing the generated dynamic bitmap index only if the required storage capacity does not exceed the predetermined threshold.

18. The tangible computer readable storage medium of claim 11, wherein the data of the database includes at least one data table having a plurality of columns, the generated dynamic bitmap index being associated with a specific column, the process further comprising, prior to storing the generated dynamic bitmap index:
- determining whether a required storage capacity for all stored dynamic bitmap indexes for the specific column exceeds a predetermined threshold; and
- storing the generated dynamic bitmap index only if a required storage capacity for all stored dynamic bitmap indexes for the specific column does not exceed the predetermined threshold.

19. The tangible computer readable storage medium of claim 11, wherein the process further comprises, prior to storing the generated dynamic bitmap index:
- retrieving a user behavior pattern indicating a multiplicity of query conditions of previous queries executed by a user, the multiplicity of query conditions including the previous query condition;
- determining, from the user behavior pattern, a frequency of occurrence of the previous query condition; and
- storing the generated dynamic bitmap index only if the frequency of occurrence exceeds a predetermined threshold.

20. The tangible computer readable storage medium of claim 11, wherein the process further comprises:
- determining whether the data of the database has changed since execution of the previous query; and
- determining a query result for the current query using the retrieved previously generated dynamic bitmap indexes only if the data of the database has not changed.

21. A data processing system comprising:
a database having data; and
a query execution manager residing in memory for managing execution of a query against the data of the database, the query execution manager being configured for:
- receiving a current query against the data of the database, the current query including a plurality of query conditions;
- for the plurality of query conditions:
  - determining whether any previously generated dynamic bitmap index can be re-used for the current query, the previously generated dynamic bitmap index having been previously generated to satisfy a previous query executed against the data of the database, wherein a first and a second query condition of the plurality of query conditions are connected by an operator and wherein the dynamic bitmap index is a combination, according to the operator, of (i) a first dynamic bitmap index generated for a query condition related to the first query condition and (ii) a second dynamic bitmap index generated for a query condition related to the second query condition; and
  - retrieving the previously dynamic bitmap index; and
- determining a query result for the current query using only the retrieved previously generated dynamic bitmap index; and
- if no previously generated dynamic bitmap index can be re-used, for the plurality of query conditions:
  - generating a dynamic bitmap index for a combination of at least two query conditions of the plurality of query conditions connected by at least one operator; and
  - storing the generated dynamic bitmap index for retrieval in execution of a subsequent query having a subsequent related query condition.

* * * * *